(12) United States Patent
Lich

(10) Patent No.: US 8,032,275 B2
(45) Date of Patent: Oct. 4, 2011

(54) DEVICE AND METHOD FOR SIDE IMPACT DETECTION IN A VEHICLE

(75) Inventor: Thomas Lich, Schwaikheim (DE)

(73) Assignee: Robert Bosch GmbH, Stuttgart (DE)

( * ) Notice: Subject to any disclaimer, the term of this patent is extended or adjusted under 35 U.S.C. 154(b) by 295 days.

(21) Appl. No.: 11/990,418

(22) PCT Filed: Jul. 17, 2006

(86) PCT No.: PCT/EP2006/064301
§ 371 (c)(1),
(2), (4) Date: Oct. 13, 2009

(87) PCT Pub. No.: WO2007/020145
PCT Pub. Date: Feb. 22, 2007

(65) Prior Publication Data
US 2010/0042286 A1     Feb. 18, 2010

(30) Foreign Application Priority Data
Aug. 12, 2005   (DE) .......................... 10 2005 038 227

(51) Int. Cl.
*G06F 7/00* (2006.01)
(52) U.S. Cl. .............. 701/31; 701/36; 701/45; 180/274; 180/282
(58) Field of Classification Search .................... 701/29, 701/31, 33, 36, 45, 46, 48, 300, 301; 180/271, 180/274, 282
See application file for complete search history.

(56) References Cited

U.S. PATENT DOCUMENTS

| | | | |
|---|---|---|---|
| 7,831,357 B2 * | 11/2010 | Loeckle et al. ................. | 701/45 |
| 7,873,473 B2 * | 1/2011 | Baumann et al. ............. | 701/301 |
| 7,881,842 B2 * | 2/2011 | Kuttenberger et al. ......... | 701/45 |
| 2004/0182627 A1 | 9/2004 | Bujak | |

FOREIGN PATENT DOCUMENTS

| | | |
|---|---|---|
| EP | 1 343 661 | 6/2004 |
| EP | 1 566 312 | 8/2005 |
| WO | WO 03/031236 | 4/2003 |
| WO | WO 2004/069603 | 8/2004 |
| WO | WO 2005/123462 | 12/2005 |

* cited by examiner

Primary Examiner — Richard M. Camby
(74) Attorney, Agent, or Firm — Kenyon & Kenyon LLP

(57) ABSTRACT

A method and a device for side impact detection in a vehicle. A first signal is generated by a side impact sensor system. A plausibility sensor system determines the direction and magnitude of a lateral speed of the vehicle and/or a slip angle as a plausibility signal. A processor is provided which detects the side impact as a function of the first signal and the plausibility signal.

6 Claims, 4 Drawing Sheets

DEVICE AND METHOD FOR SIDE IMPACT DETECTION IN A VEHICLE

BACKGROUND INFORMATION

Side impact detection with the aid of a temperature sensor is described in European Patent No. EP 1343661. The temperature sensor is provided as a side impact sensor system in a cavity of a lateral section. An acceleration sensor system or a structure-borne noise sensor system may be used for a plausibility check.

SUMMARY OF THE INVENTION

The device for side impact detection and the method for side impact detection in a vehicle according to the present invention have the advantage that the plausibility sensor system generates variables of the dynamics of vehicular operation as a plausibility signal. These variables are present before contact, thus enabling a quick plausibility check which does not limit the performance of a rapid side impact sensor system. The data of the dynamics of vehicular operation are the magnitude and direction of the lateral velocity and/or the slip angle, which preferably may be provided from a vehicle dynamics control system. Thus, the control unit for the vehicle dynamics control system is connected to a control unit for passenger protection means. This connection may preferably be designed as a CAN bus, although other connections such as point-to-point connection are also possible to ensure rapid transmission of these data.

The present invention is based on the concept that a side impact may be rapidly detected by use of the lateral velocity and/or the slip angle for a plausibility check of a side impact detected by a contact sensor, a pressure and/or acceleration and/or structure-borne noise sensor, for example, or by another physical principle. To this end, the algorithm for side impact detection is supplemented by an additional plausibility path which considers the lateral velocity, i.e., its magnitude and direction, and/or the slip angle as input information.

For a side impact, the decisions for activating passenger protection means must be made within a period of 4 ms to 10 ms after the impact. This generally requires a plausibility signal from either an acceleration sensor in the B- or C-pillar, or a plausibility check performed by the central airbag control unit, so that the triggering decision may be robust against so-called cases of misuse, i.e., false deployments. Namely, the side impact sensor system may deliver a spurious signal.

By using the magnitude and direction of the lateral velocity, better deployment performance may be achieved using the device and the method according to the present invention as the result of the preceding plausibility check in the case of lateral drifting of the vehicle followed by an impact, for example with a post or a tree. Depending on the configuration, the improvement is in the range of 1.5 ms to 4 ms. Expressed as a percentage, this represents approximately a 40% to 50% improvement. Improved protection is therefore expected for so-called pole crashes, which constitute approximately 17% of side impacts, in which the vehicle runs into an object of this size, resulting in a lateral collision.

The use of the lateral velocity and/or slip angle results in added value, since existing sensor systems may be used and therefore no significant additional costs are incurred.

It is particularly advantageous that the plausibility signal is held for a specified time. This has the advantage that when the plausibility signal once again falls below a threshold value this does not immediately result in resetting of variables in the algorithm, and the plausibility flag is thus held for a specified time. If this time has elapsed, the corresponding variables are reset in the algorithm.

It is also advantageous that a flag is set when the signal from the side impact sensor system exceeds a noise threshold. This indicates that the method according to the present invention has thus been started, since signals may then be generated which indicate a side impact.

A further advantage is that when the magnitude of the lateral velocity exceeds a specified threshold a counter is started which is compared to a specified time. This allows an assessment of the relevancy of the plausibility signal, and also enables a prediction of the response of the vehicle.

DETAILED DESCRIPTION

Figure 1:
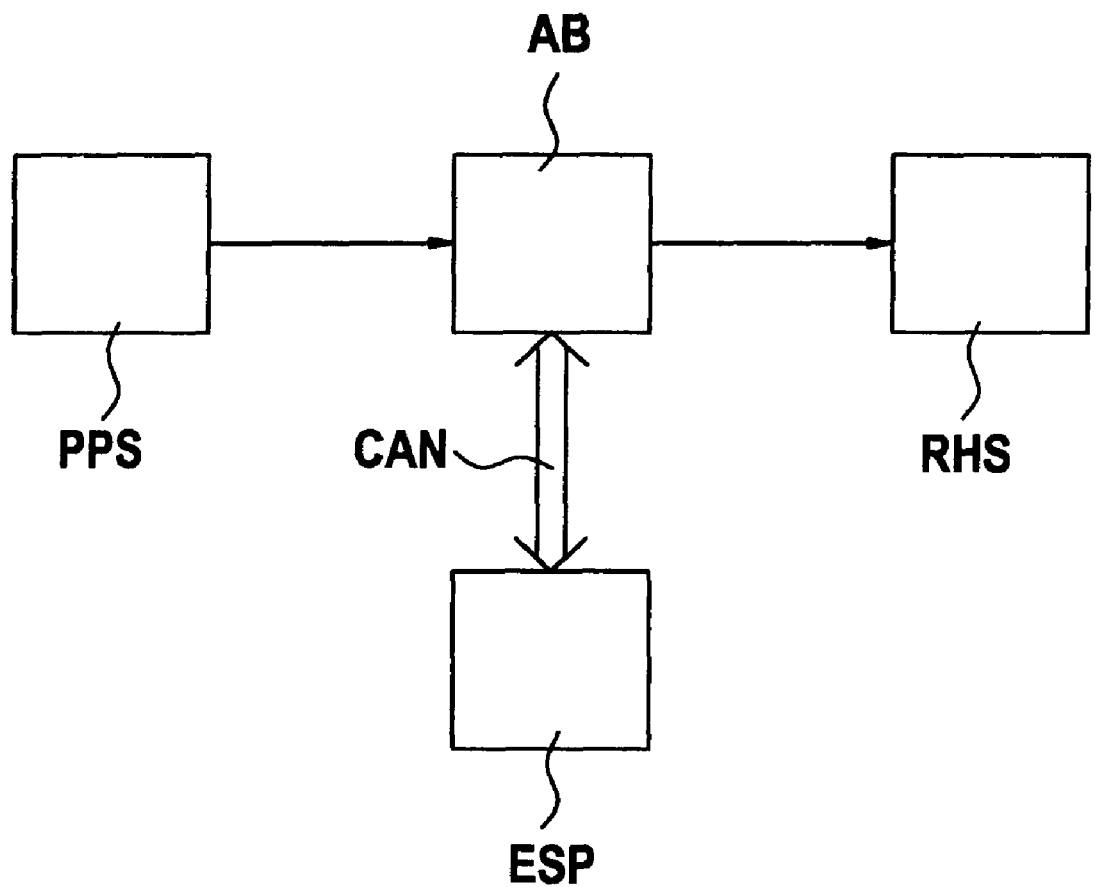
FIG. 1 shows a block diagram of the device according to the present invention.

FIG. 1 illustrates the device according to the present invention in a block diagram. A side impact sensor system PPS is connected to an airbag control unit AB via a line. In this case, side impact sensor system PPS is a pressure sensor system, situated in a lateral section of a motor vehicle, which detects a side impact at that location via an adiabatic pressure increase. This sensor system is very quick and therefore very efficient. Alternatively, an acceleration sensor system may be used which is situated in the lateral sections of the motor vehicle. These lateral sections include, for example, the A-, B-, or C-pillars, doors, door sills, crossbars, and other suitable installation sites. In addition, a temperature sensor system which in the event of a side impact detects a temperature increase in a cavity may be used here. Furthermore, a structure-borne noise sensor system which is able to detect an impact particularly early is possible here. An environmental sensor system may also be provided here.

In the present case, the connection of side impact sensor system PPS to airbag control unit AB is a point-to-point connection having a unidirectional design, the airbag control unit being activated by pulses from multiple pressure sensors, connected in a type of quasi-bus, to transmit sensor values in a specified manner. Sensor bus technology, a radio bus, or optical transmission are also possible. The airbag control unit itself has a processor, a memory, interface components, and ignition circuit control units in addition to plausibility sensors, and processes the signals from side impact sensor system PPS by use of these components. If the trigger algorithm running on the processor in the airbag control unit detects a side impact, passenger protection means RHS which are connected to the airbag control unit via an output are activated. These passenger protection means RHS include airbags, seat-belt tensioners, roll bars, side bolsters, and/or headrests. However, activation by airbag control unit AB occurs only when a plausibility signal is also present. According to the present invention, this plausibility signal is the magnitude and the direction of the lateral velocity, i.e., the transverse velocity of the vehicle, and/or the slip angle.

The control unit supplies these data to vehicle dynamics control system ESP. These data may be determined in a sensor box to which airbag control unit AB is connected. It is also possible for control unit AB and the control unit for vehicle dynamics control system ESP to be combined into one control unit. Other sensor signals such as from an interior sensor system are also used in activating passenger protection means RHS. These passenger protection means include, for example, force measuring bolts which are mounted on the vehicle seat and are able to determine the weight and weight distribution. In this case, the connection between airbag control unit AB and the control unit for vehicle dynamics control system ESP is designed as a CAN bus connection. Multiple users may be connected to this CAN bus connection, but for safety reasons it may be possible that only one point-to-point connection is provided. Other secure data transmission connections are possible between control unit AB and control unit ESP.

Figure 3:
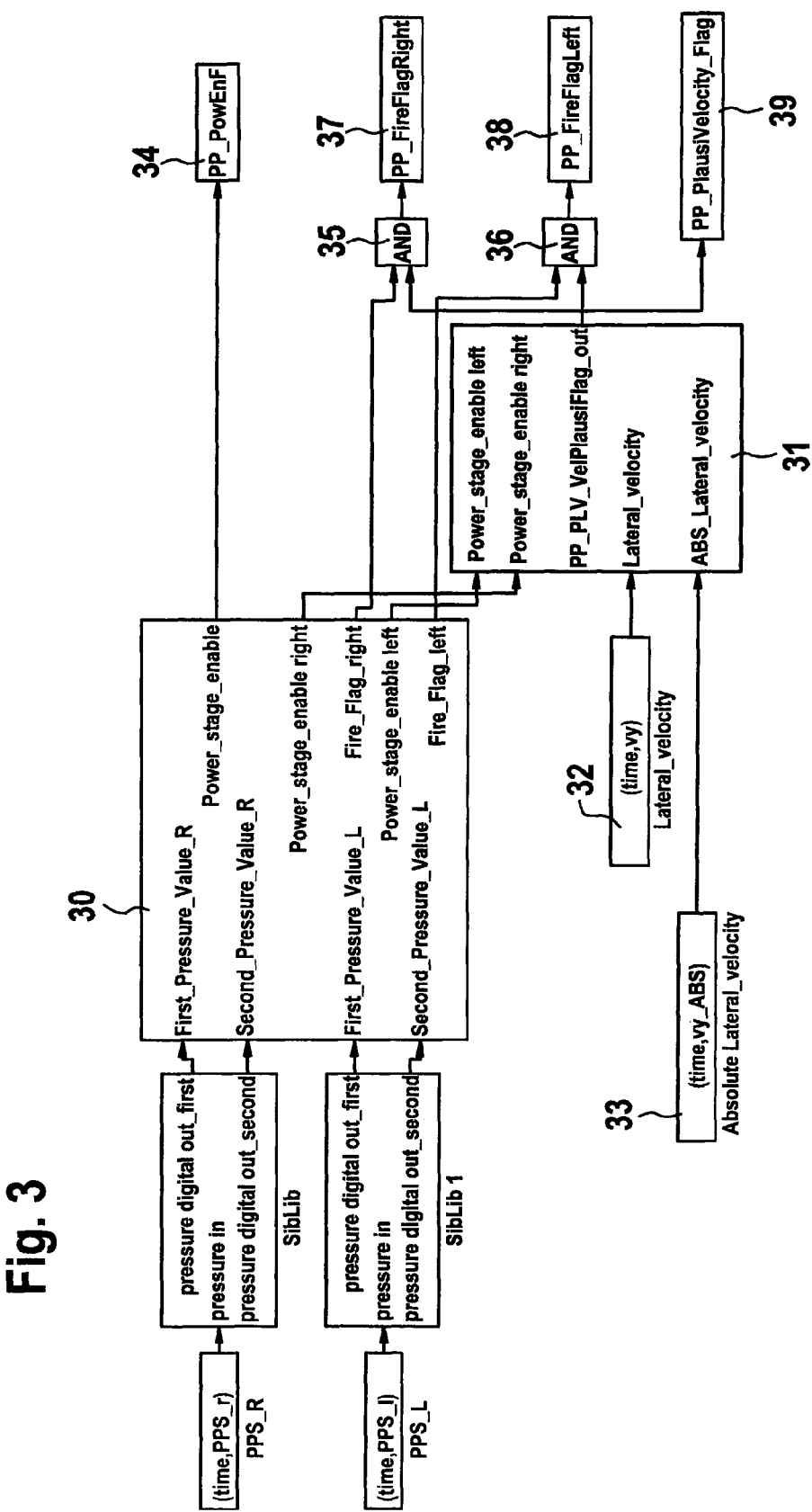
FIG. 3 shows a further block diagram of the method according to the present invention.

FIG. 3 shows an implementation of the method according to the present invention in a block diagram. The upper blocks, represented by block 30, for example, illustrate the trigger algorithm for the pressure signal. Trigger algorithm 30 contains as input data the pressure sensor signals from the right and left sides, illustrated here as PPS_R and PPS_L, respectively. These pressure sensor signals are digitized in component SibLib and SibLib1, filtered, amplified, and transmitted to algorithm 30. The algorithm typically runs on the processor in airbag control unit AB, which is usually centrally located. However, other installation sites may be also provided for airbag control unit AB. The plausibility check is performed in block 31. Lateral velocity 32 enters block 31 as an input value, in addition to the absolute lateral velocity generated by control unit ESP. As a result of evaluation of the pressure signals, plausibility check block 31 receives so-called enable signals from algorithm 30 which indicate whether the power stage on the left and right is activated.

The magnitude of the lateral velocity, which in this case is generated in block 33, may also optionally be generated within processing 31, but does not necessarily have to be provided as an additional input. A further option is to use the slip angle and/or a combination of the slip angle and the lateral velocity.

Blocks 35 through 39 represent a logic circuit. Initialization flags Power_stage_enable_left and Power_stage_enable_right are transmitted from pressure algorithm 30 to block 31. These flags are provided for both the left and right side within the pressure algorithm. This separation is a component of the pressure algorithm. In addition, ignition flags Fire_flag_right, Fire_flag_left are supplied from pressure algorithm 30 to AND gates 35 and 36, respectively. This ignition decision or trigger decision by the pressure algorithm is then checked for plausibility according to the present invention by use of the lateral velocity, specifically its magnitude and direction. This flag exits block 31 in the form of a result, and is connected to the second inputs of AND gates 35 and 36. Thus, it is clear that AND gates 35 and 36 issue a plausibility-checked trigger decision 37 or 38 only when the ignition flag and the plausibility flag are set. This flag is then directly fed to the ignition circuits. Flags 34 go to the power output stages, and in addition flag 39 goes to the ignition circuit output stages.

Figure 2:
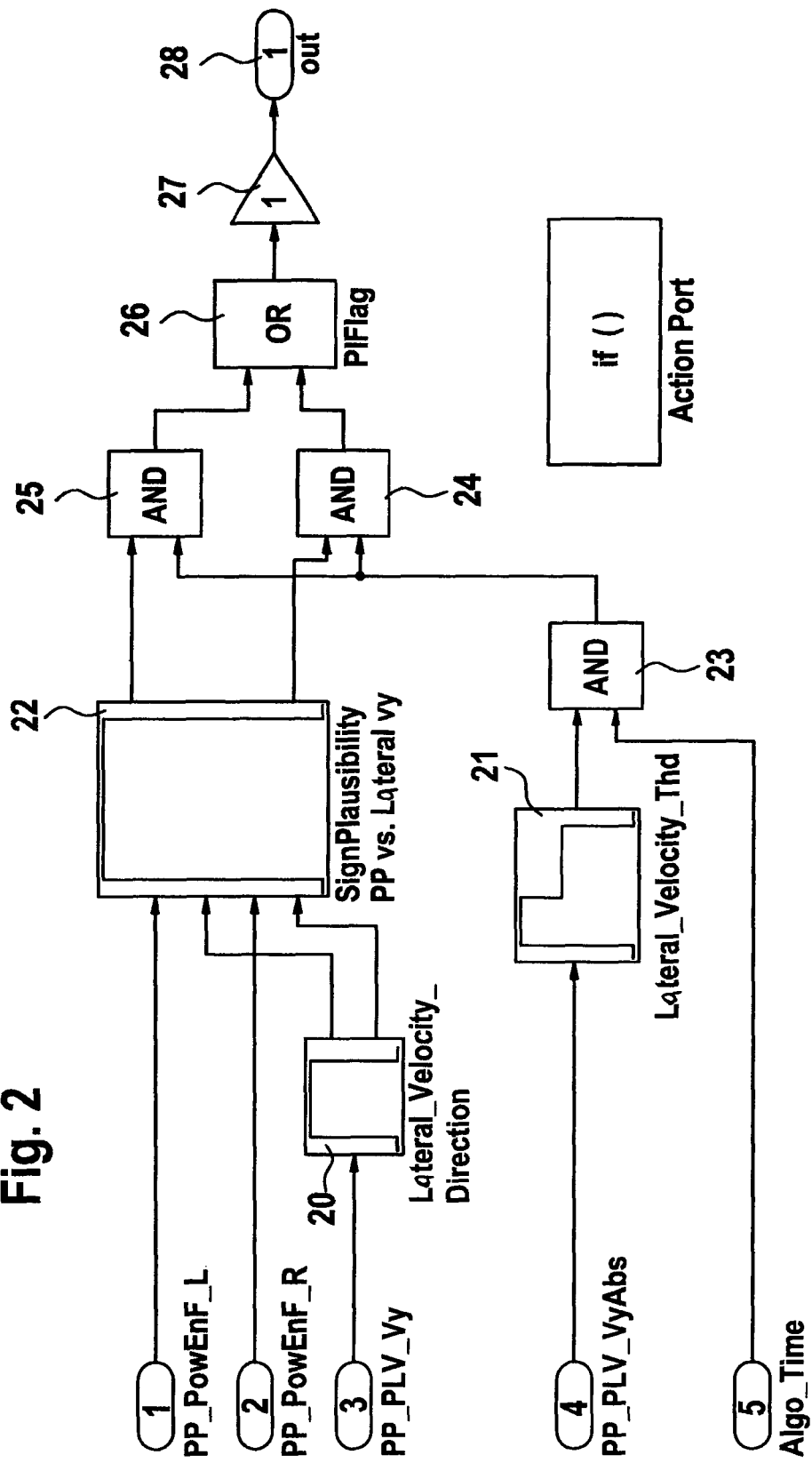
FIG. 2 shows a block diagram of the method according to the present invention.

The plausibility check block in FIG. 2 is considered once again in detail. Input information items 1 and 2 are the initialization flags for the pressure algorithm which are delivered to block 22. These initialization flags are sent when a noise threshold is exceeded, thereby sensitizing the pressure algorithm for a possible side impact. In addition, the direction of the lateral velocity is determined via flag 3 which is fed to block 20, and this information enters block 22. The absolute value of the lateral velocity is fed to a threshold value decider 21 via input 4. This threshold value decider 21 may also be configured in a time-dependent manner, i.e., the threshold value is not equal over all time periods, but instead varies over time. A time flag is set via input 5, and the time flag is activated when the magnitude of the lateral velocity exceeds a first threshold. A counter is then incremented, beginning at a predetermined starting value. Algebraic sign extraction is then performed in block 20 to determine the direction of a skid process. In a further processing step in block 22, the algebraic signs are compared to the flags from the pressure algorithm, i.e., the initialization flags. The flags illustrated here are provided from the algorithm for evaluating the signals from the pressure sensors, although other sensors, for example acceleration or structure-borne noise sensors, may also be used.

The algebraic signs from the pressure algorithm and the plausibility check path are compared in block 22. This review of the algebraic signs means that drifting, characterized by a negative sign, for example, is compared to an initialization flag on the left side, which indicates that a possible impact is occurring on the left side of the vehicle. In other words, a skid to the left with possible deployment of the passenger protection means on the left side is recognized as plausible, whereas drifting to the left with possible deployment on the right side is implausible. The result from this processing is a flag which indicates whether this query is correct or incorrect. This is indicated by output 28. In a parallel process the magnitude of the lateral velocity is compared to a second settable threshold. This occurs in block 21. The second adjustment parameter is generally larger than the first threshold value, and characterizes a value above which the passenger protection means are, or are not, identified as plausible in the event of a lateral motion after an impact. If the instantaneous speed is greater than this threshold value, the result is a logical 1, which is additionally linked to downstream logic elements 23, 24, 26, and 27, as well as 25 together with the direction information. This block may be combined as an overall logic circuit which delivers a result in the form of another flag which checks the speed and the direction for plausibility. The actual linkage to the trigger decision of the pressure or acceleration algorithm for activating the passenger protection means then occurs, as illustrated in FIG. 3.

In a further possible design, the logic system may be expanded in such a way that the slip angle as a single or absolute value is compared to a third settable threshold value. For a slip angle of approximately 90°, i.e., an exclusively lateral drift of the vehicle, the impact occurs at an obtuse angle, so that in this case deployment is justified in all cases. For a slip angle of approximately 10°, i.e., an acute angle, deployment may be prevented by use of parameterization, so that no additional cases of misuse occur. The evaluation takes place via an extension of the AND link within the logic circuit illustrated in FIG. 3.

So that the plausibility decision does not result in immediate resetting of the counter and flags after the value drops below the threshold value, the flag is separately held once again in a parameterizable filter for a predetermined period of time. The counter and the plausibility flag are not reset until the filter is reset.

Figure 4:
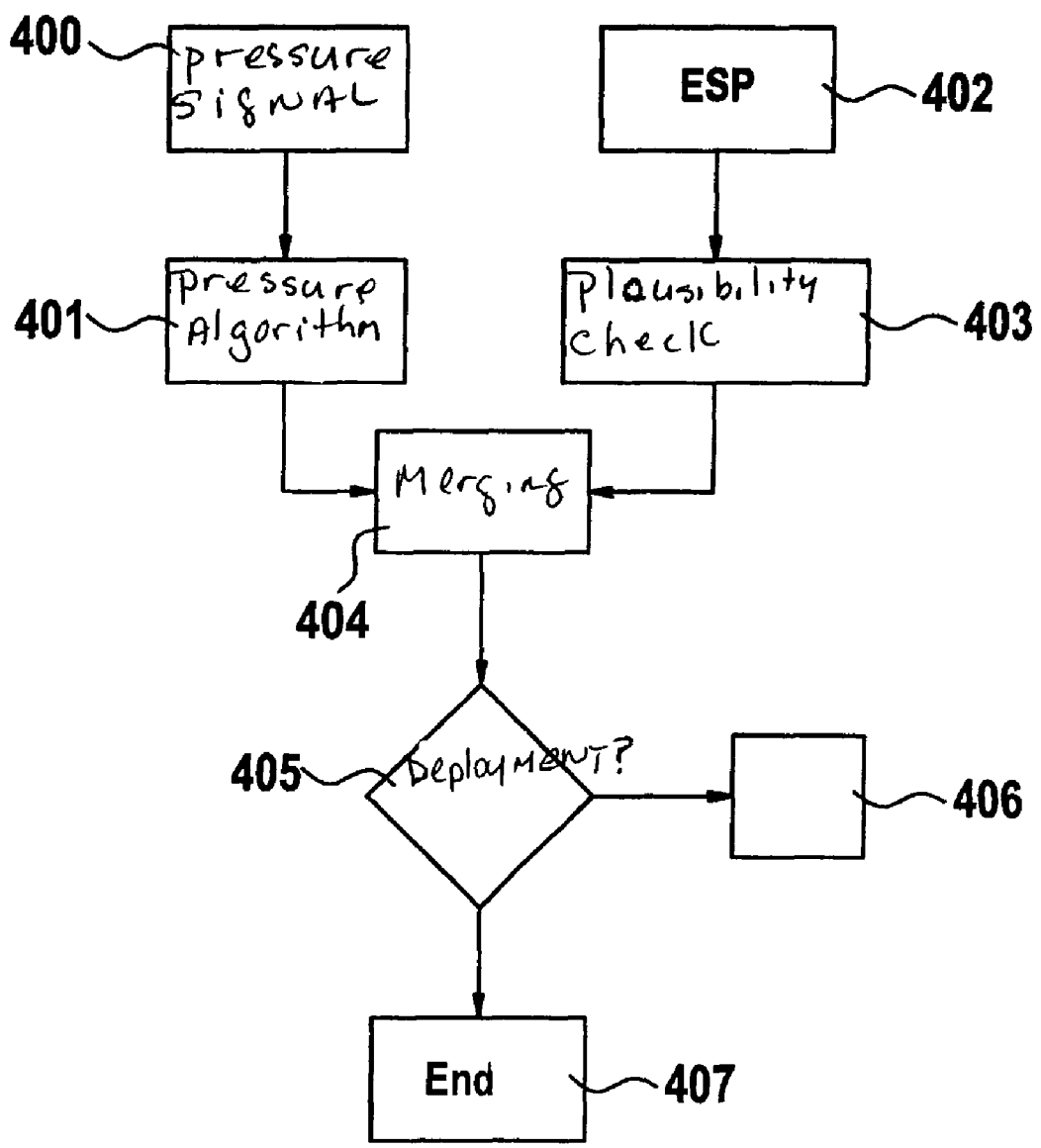
FIG. 4 shows a flow chart of the method according to the present invention.

The method according to the present invention is explained once again in the flow chart according to FIG. 4. Method step 402 supplies to control unit ESP the vehicle dynamics data of lateral velocity and/or the slip angle. In method step 403, as described above, the magnitude and direction are extracted from the lateral velocity and compared to data from the pressure algorithm in order to perform the plausibility check. In method step 400 the pressure signal is generated by the pressure sensor and enters pressure algorithm 401. In method step 404 the plausibility check is merged with the trigger decision. In method step 405 a query is made as to whether the deployment should take place. If this is the case, the corresponding passenger protection means are activated in method step 406. If this is not the case, the method according to the present invention ends in method step 407.

What is claimed is:

1. A device for side impact detection in a vehicle, comprising:
    a side impact sensor system which generates a first signal;
    a plausibility sensor system which determines a direction of a lateral velocity of the vehicle and at least one of a magnitude of the lateral velocity of the vehicle and a slip angle of the vehicle as a plausibility signal for the side impact; and
    a processor which detects the side impact as a function of the first signal and the plausibility signal.

2. The device according to claim 1, further comprising a CAN bus for connecting the plausibility sensor system to the processor.

3. A method for side impact detection in a vehicle, comprising:
    generating a first signal by a side impact sensor system;
    determining a direction of a lateral velocity of the vehicle and at least one of a magnitude of the lateral velocity of the vehicle and a slip angle of the vehicle as a plausibility signal for the side impact; and
    detecting the side impact as a function of the first signal and the plausibility signal.

4. The method according to claim 3, further comprising holding the plausibility signal for a predefined time.

5. The method according to claim 3, further comprising setting a flag when the first signal exceeds a noise threshold.

6. The method according to claim 4, further comprising:
    starting a counter when the magnitude of the lateral velocity exceeds a predefined threshold; and
    comparing the counter to the predefined time.

\* \* \* \* \*